United States Patent [19]

Koch

[11] Patent Number: 4,817,223
[45] Date of Patent: Apr. 4, 1989

[54] AIRPORT PASSENGER RAMP

[75] Inventor: Robert Koch, Bad Sooden-Allendorf, Fed. Rep. of Germany

[73] Assignee: Hubner Gummi-und Kunststoff GmbH, Fed. Rep. of Germany

[21] Appl. No.: 36,007

[22] Filed: Apr. 8, 1987

[30] Foreign Application Priority Data

Feb. 3, 1987 [DE] Fed. Rep. of Germany ....... 3703347

[51] Int. Cl.$^4$ ............................................. B64F 1/305
[52] U.S. Cl. ...................................... 14/71.1; 14/71.5
[58] Field of Search ............................... 14/71.5, 71.1; 52/173 DS

[56] References Cited

U.S. PATENT DOCUMENTS

| | | | |
|---|---|---|---|
| 3,528,086 | 9/1970 | Conger | 52/173 DS X |
| 3,588,934 | 6/1971 | Van Marle | 14/71.5 |
| 3,639,934 | 2/1972 | Eggert, Jr. | 14/71.5 |
| 3,711,881 | 1/1973 | Chapman et al. | 14/71.5 |
| 3,816,867 | 6/1974 | Shirzad et al. | 14/71.5 |
| 3,843,987 | 10/1974 | Lodjic | 14/71.5 |
| 4,112,958 | 9/1978 | Anderberg | 14/71.5 X |
| 4,120,067 | 10/1978 | Hone et al. | 14/71.5 |
| 4,712,339 | 12/1987 | Wenham et al. | 14/71.5 X |

Primary Examiner—Jerome W. Massie
Assistant Examiner—Matthew Smith
Attorney, Agent, or Firm—Scully, Scott, Murphy & Presser

[57] ABSTRACT

The invention relates to a covered passenger ramp having a back end adapted to provide a connection with an airport building to enable passengers to leave said building via said ramp, an upper, front end, and a telescoping element adapted to move said front end into the proximity of an airplane fuselage, for which purpose it is to be moved further out than the lower front ramp end. In order to adapt the front end of the ramp to different shapes of fuselage in a better manner than has hitherto been possible, an end of the telescoping element remote from the front ramp end has means for positively setting it so that by varying the inclination of the telescoping element the upper, front ramp end may be caused to come into engagement with the fuselage.

6 Claims, 3 Drawing Sheets

AIRPORT PASSENGER RAMP

BACKGROUND OF THE INVENTION

The invention relates to covered airport passenger ramps.

In order to enhance the comfort of passengers, many airports are provided with covered ramps made i.e. ramps with roofs spanning them. The ramp makes it possible for passengers to go on board the airplane from the airport building directly, since such ramps bridge over the ground between the airport building and the airplane door in its fuselage. Despite its considerable length, a covered ramp is a more or less rigid structure with upright side walls and the roof spanning them. One end of the ramp is connected with the airport building. The other or front end of the covered ramp has to be fitted with elastically deforming material in order to contact the part of the airplane fuselage around its doorway with the least possible gap. The elastic part is generally constructed in the form of a so-called bumper which has various guide means so that it may engage as much of the contour of the fuselage as possible around the door. The guide means commonly take the form of telescoping elements whose one end is respectively hinged to the front end of the rigid covered ramp and whose other end holds the bumper near its top end. On the basis of the general contour of all fuselages the direction of adjustment of the telescoping element has to be the resultant of a vertical and a horizontal component of motion, the direction of the resultant being so determined that with most of the possible fuselage shapes there is a snug engagement of the bumper thereon. However, a compromise has to be made and this means that there may be gaps left between parts of the bumper and the fuselage owing to the shape of the latter departing too far from the basic fuselage configuration for which the bumper is primarily designed. In fact, in most cases there will be a larger or smaller gap, more especially at the upper corner of the bumper nearer the nose of the airplane, because it is here that there is generally a more pronounced curvature of the fuselage in two planes, that is to say on the one hand towards the top of the fuselage and on the other towards the nose of the airplane.

SHORT SUMMARY OF THE PRESENT INVENTION

One object of the invention is to provide a way of so adapting the front end of the covered passenger ramp that there is a substantial improvement as regards snug engagement with a wide range of differing fuselage shapes.

In order to achieve this or other objects of the invention appearing herein, the invention takes as a starting point a covered passenger ramp able to be adapted to different fuselage curvatures and having an upper front ramp end with a telescoping rod to move it towards the fuselage and is to be moved further outwards in the direction of the tunnel than the lower, front end of the ramp; the invention develops the design further in such a way that the end of the telescoping rod further from the front ramp end is able to be positively adjusted in order to ensure that, by changing the inclination of the telescopic rod, the upper, front ramp end may be caused to engage different shapes of fuselage.

Further features of the invention are defined in the claims and described in the ensuing detailed account of one possible form of the invention as shown in the diagrammatic drawings of the outline of a ramp in accordance with the prior art and one ramp in accordance with the invention.

LIST OF THE SEVERAL VIEWS OF THE DRAWINGS

DETAILED ACCOUNT OF WORKING EXAMPLE OF THE INVENTION

Figure 1:
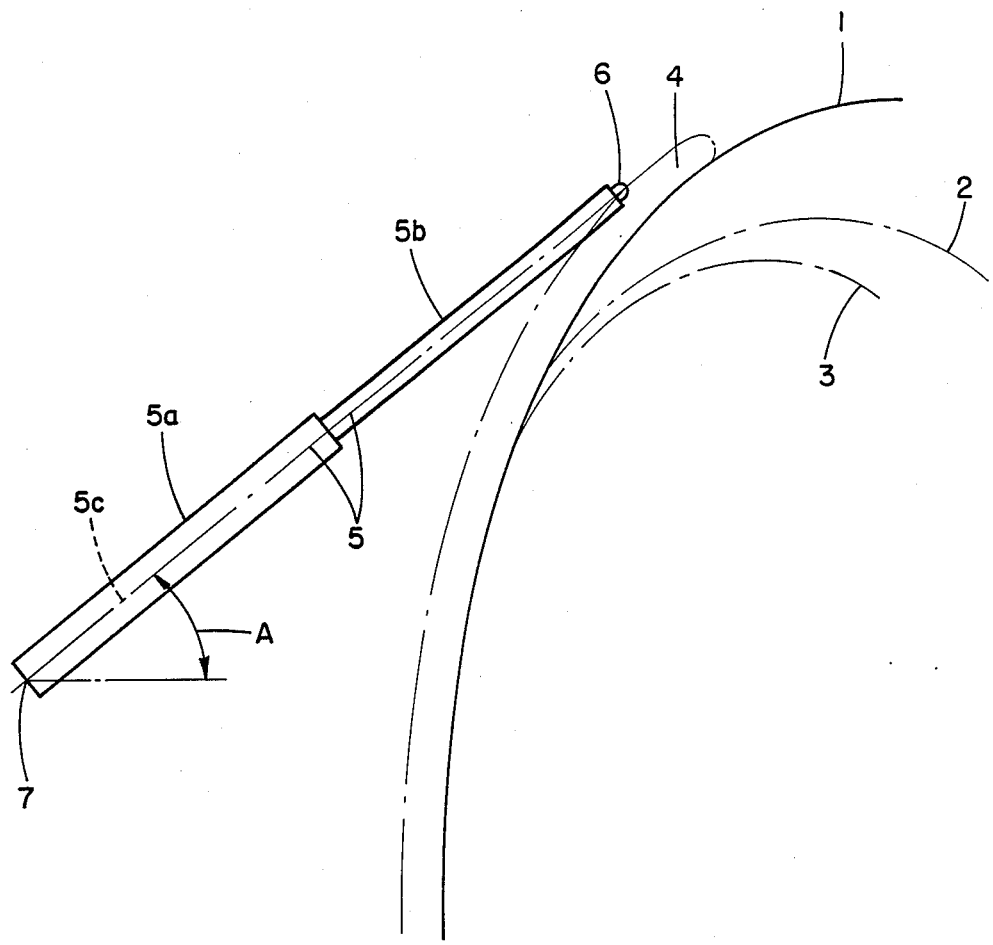
FIG. 1 shows such a prior art construction.

In FIG. 1 the cross sectional outlines of three different fuselage forms are marked by the lines 1, 2 and 3. The ramp has a front end in the form of a bumper 4 which is elastically deformable. This bumper has an adjustment device 5 in the form of a telescoping system whose outer end is pivotally connected with the top end of the bumper at connection point 6. The inner end of the adjustment device 5 is pivoted to a fixed part of the passenger ramp at pivot point 7. The adjustment device in the form of a telescoping system consists of an outer tube 5a or cylinder and inner tube 5b or piston, so that by positively changing the amount of fluid (more particularly liquid) filling of the cylinder delimited in the cylinder space 5c by the outer tube 5a and the inner tube 5b, the length of the adjusting device may be altered. On extending the adjusting device 5 the front end of the passenger ramp is moved towards the airplane fuselage and engages it. On shortening the adjusting device 5 the front end of the passenger ramp with the bumper 4 thereon is so far removed from the fuselage that the passenge ramp comes clear of the airplane. It is convenient if the motion caused by the adjusting device is combined with a horizontal movement, which may take place simultaneously with, before or after said motion in order to be able to modify the distance between the front end of the passenger ramp and the fuselage to a greater extent. It is furthermore convenient if there is such an adjusting device 5 on each side of the covered passenger ramp. As will be seen from FIG. 1, the bumper 4 will only make a gap-free engagement with the part 1 of the airplane fuselage outline. Such engagement, free of gaps, is not possible at the parts 2 and 3 of the outline of the fuselage, because the direction of shift of the adjusting device 5 is excessively steep. The adjusting device 5 would then stretch the bumper upwards without causing neat engagement.

Figure 2A:
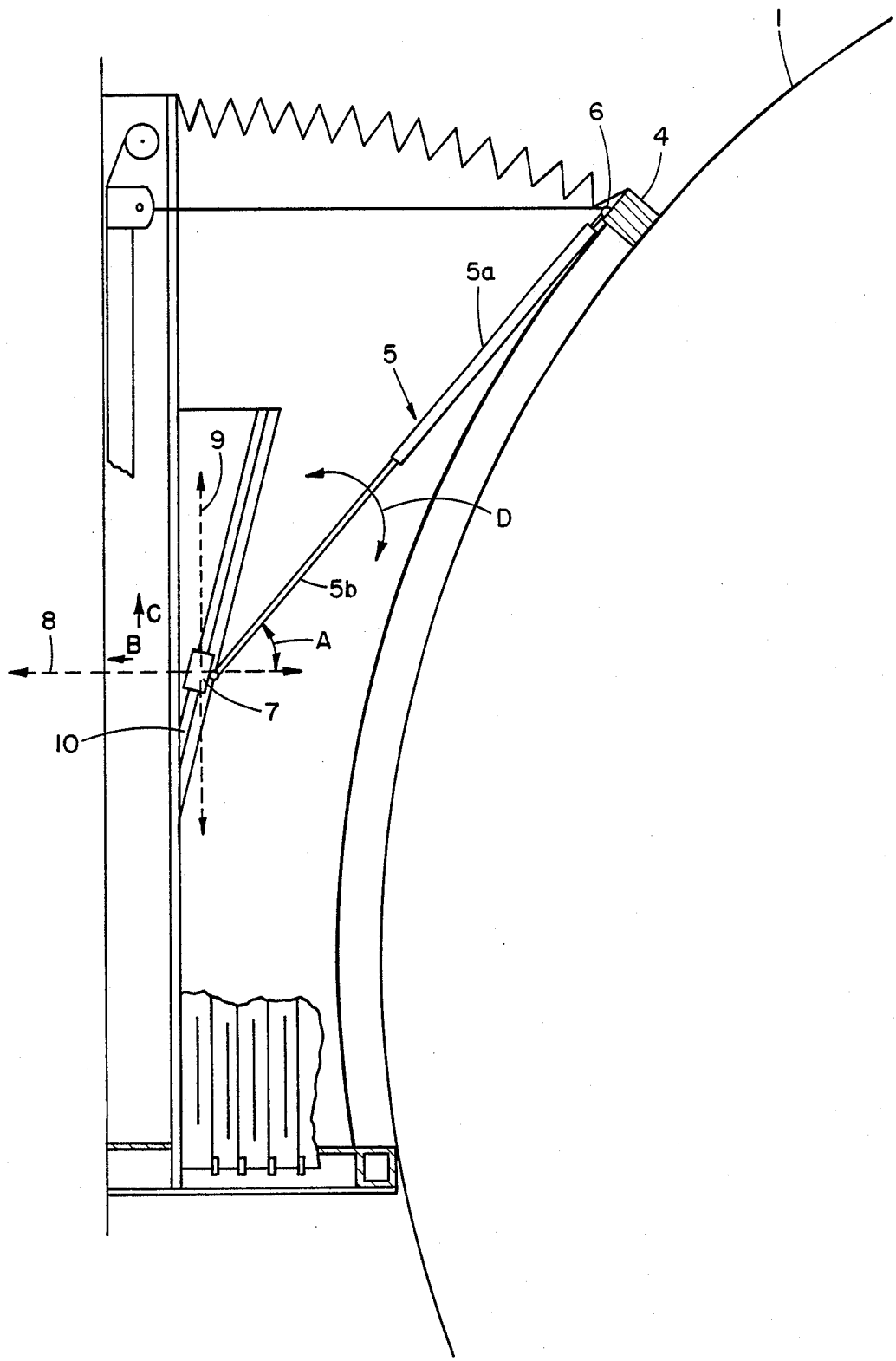
FIG. 2a shows the ramp of the present invention in position for use with one fuselage.
Figure 2B:
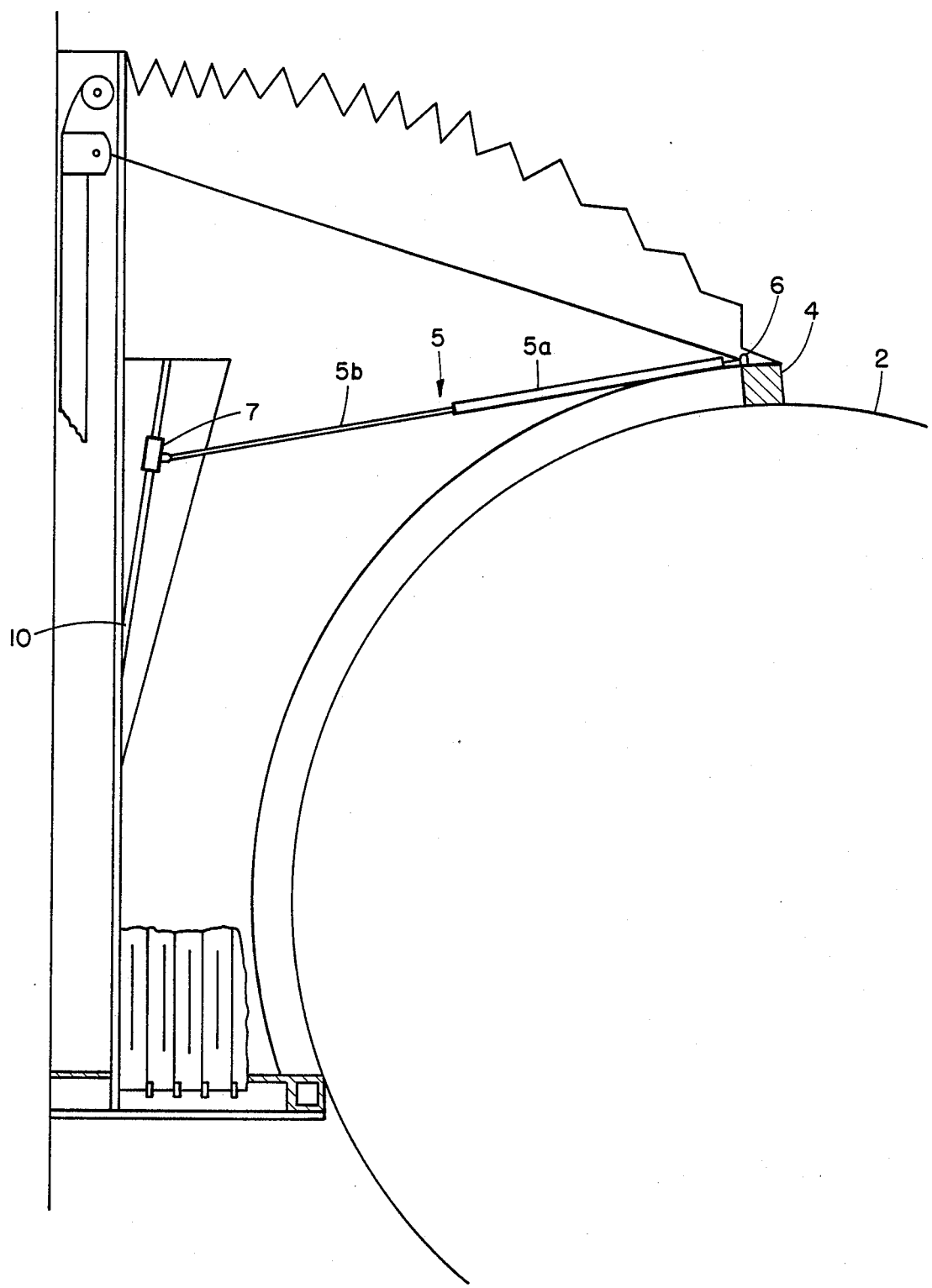
FIG. 2b shows the ramp in position for use with a different fuselage.

This shortcoming is remedied by the invention in the design of the adjusting device or devices 5 in accordance with FIG. 2. The gist of this new design is that the inclination of the adjusting device 5 (angle A) may be modified. As a result the adjusting device will firstly cause the bumper to neatly engage the more or less vertical section of the outline of the fuselage without any folds and will then cause it to engage the transitional arc leading to the more or less horizontal roof part of the fuselage in a reliable manner.

The modification of the slope of the adjusting device 5 may be effected by increasing the distance x of the inner pivot point 7 of the adjusting device 5, such increase taking place within a horizontal plane (see arrow B in FIG. 2) so that the inner pivot point 7 of the adjusting device is set within a vertical plane (arrow C) or along a path which is the resultant of two such components. A first adjustment may occur by moving the pivot point 7 along a horizontal direction 8 and then a second adjustment may occur by moving pivot point 7 along a vertical direction. A third type of adjustment may be made by moving the pivot point 7 along a vertical direction 9, whose lower end is held in a movable joint 10 on a fixed part of the passenger ramp, which allows pivoting motion of the adjusting device 5 in the direction indicated by the double arrow D.

In the case of a particularly convenient design of the invention the adjusting device 5 is held on a vertical guide, which for its part is designed as a telescoping element. The second telescoping element, which forms the adjusting device 5, for its part has its lower end pivoted to a fixed part of the passenger ramp. The adjusting force in the case of this telescoping element is less than the adjusting force for the telescoping element of the first adjusting device and the adjustment stroke of the first adjusting device is limited positively. This means that the pivot point 7 is first moved upwards on moving out the adjusting device 5 until the upper limit is reached, after which the telescoping element of the first adjusting device is extended and the bumper 4 is brought neatly into engagement with the different contours of the fuselage.

I claim:

1. A covered passenger ramp having a back end adapted to provide a connection with an airport building to enable passengers to leave said building via said ramp and board an airplane, comprising an upper and lower front end, a telescoping element connected at one end to said upper front end and adapted to move said upper front end into the proximity of an airplane fuselage, for which purpose said upper front end is to be moved further out than the lower front ramp end, an opposite end of the telescoping element, connected at a controlled movable pivot point remote from the upper front ramp end, said opposite end of the telescoping element having means for varying the inclination in a horizontal and vertical direction, whereby the upper front ramp end may be caused to come into engagement with different shapes of fuselage.

2. The covered passenger ramp as claimed in claim 1 wherein an end of said telescoping element remote from said upper front ramp end is in the form of a sleeve, which is provided with a stationary vertical tube on which it may be adjusted in the longitudinal direction thereof.

3. The covered passenger ramp as claimed in claim 2 wherein the lower end of the vertical rod is pivotally supported by a joint which at least allows pivoting motion of the rod in such a manner that the distance of the top end of the rod from the fuselage may be modified.

4. The covered passenger ramp as claimed in claim 1 wherein the pivot point of the telescoping element on the end which is remote from the upper front ramp end is simultaneously adjustable in a horizontal and vertical direction.

5. The covered passenger ramp as claimed in claim 1 wherein the pivot point of the telescoping element at its end, remote from the front ramp end, is on one part of a two-part telescoping element.

6. The covered passenger ramp as claimed in claim 5, said ramp including means for applying a setting force for moving said telescoping elements, wherein the setting force of the second telescoping element is less than that of the first telescoping element.

* * * * *